US012417096B2

United States Patent
Hashimoto et al.

(10) Patent No.: US 12,417,096 B2
(45) Date of Patent: Sep. 16, 2025

(54) DATA MODEL FOR A CLOUD APPLICATION DEPLOYMENT SERVICE

(71) Applicant: HashiCorp, San Francisco, CA (US)

(72) Inventors: Mitchell Hashimoto, Los Angeles, CA (US); Evan Phoenix, Los Angeles, CA (US)

(73) Assignee: HashiCorp, San Francisco, CA (US)

( * ) Notice: Subject to any disclaimer, the term of this patent is extended or adjusted under 35 U.S.C. 154(b) by 780 days.

(21) Appl. No.: 17/575,513

(22) Filed: Jan. 13, 2022

(65) Prior Publication Data

US 2023/0221954 A1    Jul. 13, 2023

(51) Int. Cl.
*G06F 8/77*      (2018.01)
*G06Q 10/0633*   (2023.01)

(52) U.S. Cl.
CPC ........... *G06F 8/77* (2013.01); *G06Q 10/0633* (2013.01)

(58) Field of Classification Search
None
See application file for complete search history.

(56) References Cited

U.S. PATENT DOCUMENTS

| | | | | |
|---|---|---|---|---|
| 8,495,100 | B2* | 7/2013 | Cheung | G06F 8/71 707/755 |
| 12,106,093 | B2* | 10/2024 | Gross | H04L 67/10 |
| 2017/0372247 | A1* | 12/2017 | Tauber | G06F 8/71 |
| 2019/0171429 | A1* | 6/2019 | Nguyen | G06F 8/60 |
| 2020/0348931 | A1* | 11/2020 | Rafey | G06F 16/9024 |
| 2022/0215326 | A1* | 7/2022 | Bever | G06Q 10/101 |
| 2022/0385535 | A1* | 12/2022 | Verma | G06F 8/61 |
| 2023/0195453 | A1* | 6/2023 | Murray | G06F 8/73 717/123 |

* cited by examiner

*Primary Examiner* — Marina Lee
(74) *Attorney, Agent, or Firm* — FisherBroyles LLP; James P. Cleary

(57) ABSTRACT

A computing device may access a hierarchical tree structure defining a data model for a workflow tool. The workflow tool being configured for building, deploying and releasing application code of an application to one or more cloud computing platforms. The hierarchical tree structure having a plurality of nodes that store data related to the application code. The computing device may receive a request to add a projects-child node associated with a code repository to the hierarchical tree structure. The computing device may add the projects-child node to the hierarchy as a child node of the identified organization-parent node. The projects-child node can be configured to support one or more dependent child nodes depending from the projects-child node. The dependent child nodes can include at least one of an applications-child node, a builds-child node, a deployments-child node, an artifacts-child node, or a releases-child node.

16 Claims, 10 Drawing Sheets

```
300
project = "project-name"

app "app-name" {
  path = "./src"
  build {
    # ...
  }                    ← 302
  deploy {
    # ...
  }                    ← 304
  release {
    # ...
  }                    ← 306
} plugin "plugin-name" {
}
```

FIG. 5

```
project = "my-project"

app "wp-react" {
  path = "./src"
  build {
    use "pack"
  }
  registry {
    use "docker" {
      image = "waypoint/demojs"
    }
  }
  deploy {
    use "kubernetes" {
      probe_path = "/"
    }
  }
  release {
    use "kubernetes" {
      load_balancer = true
      port = 80
    }
  }
}
```

FIG. 6

```
project = "example-java"

app "example-java" {
  build {
    use "pack" {
      builder="paketobuildpacks/builder:base"
    }
  }
  deploy {
    use "docker" {
      service_port=8080
    }
  }
}
```

FIG. 7

```
» Building...
 ✓ Creating pack client
 ✓ Building image
 ✓ Injecting entrypoint binary to image Generated new Docker image: example-nodejs:latest » Deploying...
 ✓ Setting up waypoint network
 ✓ Starting container
 ": App deployed as container: example-nodejs-01EMM4TEN9SCXXE9O0F4EFQ9NR » Releasing...

The deploy was successful! A Waypoint deployment URL is shown below. This
can be used internally to check your deployment and is not meant for external
traffic. You can manage this hostname using "waypoint hostname."

Release URL: http://192.168.1.79

Deployment URL: https://instantly-worthy-shrew--v1.waypoint.run
```

FIG. 8

DATA MODEL FOR A CLOUD APPLICATION DEPLOYMENT SERVICE

TECHNICAL FIELD

The subject matter described herein relates cloud computing infrastructure, and more particularly to a workflow tool that uses a single configuration file to build, deploy and release applications across one or more cloud computing platforms.

BACKGROUND

Virtually all software applications, i.e. computer programs that are designed an written to fulfill a particular purpose or perform a particular function, have a similar lifecycle. As shown in FIG. 1, this lifecycle includes largely sequential phases of coding, testing, building, deploying, releasing, and then operating and measuring the application code. Each of these phases has distinct patterns, and can be performed using one or more well-established but phase-specific tools.

For instance, the coding and testing phases for application development typically occur within a development environment that is separate from the eventual operational infrastructure on or within which the application will be operated. The coding phase can include the use of conventional and well-known code editing tools such as Visual Studio®, while for the testing phase a development team can use a CI environment such as Circle™ and/or post the code to a code management and version control hosting platform such as Github™.

Similarly, at the opposite end of the software lifecycle in the operate and measure phases, and in particular for cloud-based applications running on cloud or multi-cloud infrastructure, tools such as Terraform®, Kubernetes®, Nomad®, Datadog®, etc. are commonly used for hosting, operating and measuring application code, no matter which specific cloud infrastructure is used or targeted for use.

However, in the build, deploy, and release phases of the application development lifecycle, things are much more complicated. For instance, the build phase exhibits a lack of standardization between application development tools, especially for cloud-based implementations. The deploy phase is presently a fragmented mix of scripts, integration tools, and product "handoffs," i.e. the collaborative work between development and operation teams. The release phase currently requires domain-specific skills that do not translate well across or between cloud platforms, as each platform has its own unique and often proprietary operating parameters, communication protocols, maintenance and version control procedures, etc. Accordingly, these three "middle" phases of the software development and deployment lifecycle are very complex and the workflow through them is difficult to manage, particularly in a multi-cloud operating environment.

Developers want a better interface to the build, deploy and release phases. Currently, developers might utilize makefiles, i.e., a file that defines a set of tasks to be executed. However, makefiles (or "maketasks") are very difficult to scale, and there is limited common or shared knowledge around this practice. Another option is to use continuous integration/continuous deployment (CI/CD) pipelines to hide the software behind an interface, such as a "git push" or by clicking a button in the CI user interface (UI). But, like makefiles, this solution tends to be very organization-specific and very fragmented between different CI environments and their respective integration and deployment tools. Yet another option currently being used is a Platform as a Service (PaaS), which provides a clean path to get an application to production. But, any action or communication that extends beyond the platform will tend to break down or become overly complicated.

Accordingly, there remain many challenges to getting an application from code into a deployment platform, despite a large and growing array of choices for such deployment. What is needed is a workflow tool to build, deploy and release applications for deployment to one or more cloud computing platforms.

SUMMARY

This document describes a workflow tool to build, deploy and release application code of an application to any of one or more cloud computing platforms. The workflow tool includes, or is implemented by, a first processor, configured to generate a single configuration file for the application. The first processor can be one or more individual processors or a virtual processor. The single configuration file includes, with a common command-line interface (CLI) language, a build configuration defining a build tool used for building the application, a deploy configuration defining a cloud computing platform to which the application will be deployed, and a release configuration defining logic for releasing the application to one or more users of the cloud computing platform. The workflow tool further includes a release uniform resource locator (URL) generated by the first processor, the release URL providing access, by the cloud computing platform to the one or more users, to the application upon the releasing.

In one aspect, a workflow tool to build, deploy and release application code of an application to any of one or more cloud computing platforms is described. In some implementations, the workflow tool includes a processor to generate a single configuration file for the application, the single configuration file comprising, using a common command-line interface (CLI) language: a build configuration defining a build tool used for building the application; a deploy configuration defining a cloud computing platform to which the application will be deployed; and a release configuration defining logic for releasing the application to one or more users of the cloud computing platform. The processor can be one or more individual processors or a virtual processor. The workflow tool further provides a release uniform resource locator (URL) generated by the first processor, the release URL providing access, by the cloud computing platform to the one or more users, to the application upon the releasing.

In one aspect, data in the workflow tool can be organized in a hierarchical tree like structure. The data in the hierarchy can be organized into parent and child nodes of various types. The nodes can store data related to the application code. Parent nodes can include user-parent nodes, that represent users, and organization-parent nodes, that represent an organization associated with a user.

Child nodes can be associated with a parent node or another child node and include projects-child nodes, teams-child nodes, runners-child nodes, workspaces-child nodes, applications-child nodes, builds-child nodes, deployments-child nodes, artifacts-child nodes and releases-child nodes.

Several child node types can be associated with an organization node including a projects-child node that can represent any projects associated with the organization. Teams-child nodes can also be associated with an organization node and represent groups of people affiliated with a given organization. A runners-child node that can be affiliated with an organization represents any of the organization's remote workflow tools registered with the workflow tool. Workspaces-child nodes can be associated with an organization and can represent the organization's physical resources.

Other child node types can be associated with other child nodes rather than parent nodes. For instance, an applications-child node can represent the application associated with at least one projects-child node. Builds-child nodes can represent the result of the operations of the workflow tool's build tool after it builds the application. Builds-child nodes can be associated with an applications-child node. Deployments-child nodes can represent the results of deploying an application with the workflow tool's deployment tool and deployments-child nodes can be associated with an applications-child node. Artifacts-child nodes can represent the result of a conversion tool and can be associated with an applications-child node. A conversion tool converts the application code to an artifact that can be usable by cloud computing platforms. A releases-child node can represent the result of the workflow tool releasing either the application code or an artifact to a cloud computing platform. Releases-child nodes can be associated with applications-child node or artifacts-child nodes.

Implementations of the current subject matter can include, but are not limited to, methods consistent with the descriptions provided herein as well as articles that comprise a tangibly embodied machine-readable medium operable to cause one or more machines (e.g., computers, etc.) to perform actions resulting in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to a workflow tool to build, deploy and release applications to one or more cloud computing platforms, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 5 shows a single configuration file that defines a consistent workflow for the build, deploy and release phases for an application deployment to a cloud platform;

FIG. 6 shows the single configuration file employing a Docker® build and a Kubernetes® deployment and release;

FIG. 7 shows a build and deploy configuration using a Buildpacks implementation;

FIG. 8 illustrates an output example when the workflow tool is run, showing the build, the output as part of that, the deploy happening, and then a release at the end including a release URL and a deployment URL;

When practical, similar reference numbers denote similar structures, features, or elements.

DETAILED DESCRIPTION

This document describes a workflow tool to build, deploy and release application code of an application to any of one or more computing platforms, especially cloud computing platforms given a wide variety of cloud computing platforms that now run applications. The term "platform" herein refers to any computing platform on which an application can run. The workflow tool described herein provides a consistent workflow to build, deploy, and release applications on any platform. In some implementations, the workflow tool is defined in a single command that encapsulates the build, deploy, and release phases to get an application from development into production.

In preferred exemplary implementations, within an application development environment, each project can have an associated configuration file. The configuration file defines each of the build, deploy and release phases, and further respectively defines and specifies the specific tool used for the build, the operation platform for which the application is intended, and the logic desired to release the application to the public via the operation platform. These aspects and features are described in more detail below.

Figure 1:
FIG. 1 illustrates a software application lifecycle from development to deployment.
Figure 2:
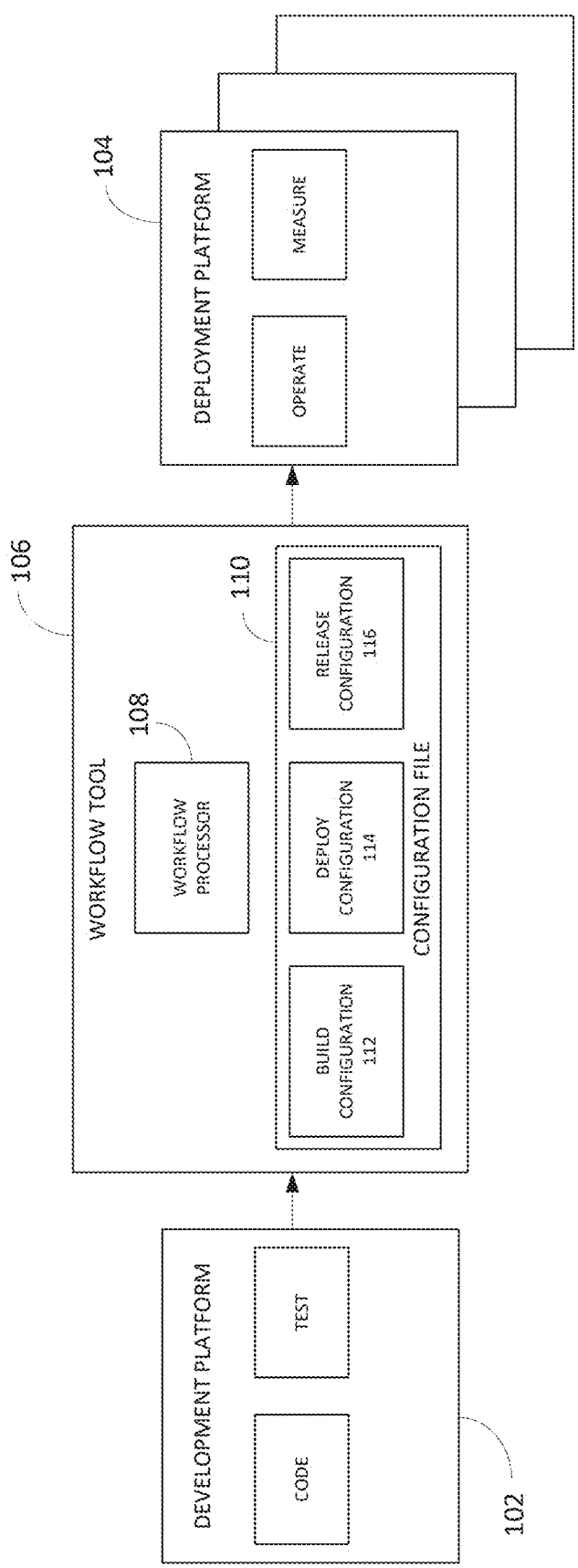
FIG. 2 is a diagram illustrating aspects of a system including a workflow tool, showing features consistent with implementations of the current subject matter.

In implementations consistent with the details described herein, and as illustrated in FIG. 2, a workflow tool 106 is provided to manage and execute the build, deploy and release phases of application deployment, between a development platform 102 (in which coding and testing take place) and a deployment platform 104 (to which an application is deployed to be operated and measured). The workflow tool 106 includes a first processor (workflow processor 108) that is configured to generate a single configuration file 110 for the application. The single configuration file 110 can be generated using a common command-line interface (CLI) language, such as HashiCorp Configuration Language (HCL). HCL is a configuration language built by HashiCorp® that uses human-readable text but is structured to be machine friendly for use with command-line tools, is JavaScript Object Notation (JSON) compatible, an can also accommodates comments.

The single configuration file 110 includes a build configuration 112 that defines a build tool used for building the application, a deploy configuration 114 defining the cloud computing platform 104 to which the application will be deployed, and a release configuration 116 defining logic for releasing the application to the intended cloud computing platform 104 for use by one or more users. The first processor 108 is further configured to generate a release uniform resource locator (URL) to provide access, by the cloud computing platform 104 to the one or more users, to the application upon the releasing.

Configuration File

Each of the build, deploy and release configurations for a project and associated application are integrated into a single configuration file 300, as illustrated in FIG. 5. In this example, a build configuration 302, a deploy configuration 304, and a release configuration 306 define the build phase, the deploy phase, and the release phase, respectively, of the application lifecycle for the application and project. By having these three configurations 302, 304, 306 in one configuration file 300, it can be referenced by a user to know the full logic and lifecycle of how that application gets to production. Thus, while the workflow tool 106, 202 does not replace tools such as container-orchestration systems for application deployment to a cloud platform, like Kubernetes®, Helm®, or Docker®, it is configured to wrap these and other tools in the single configuration file 300, provide them together in a proper order for successful application deployment, and provide a consistent workflow on top of them.

The build configuration 302 takes application source code and uses a build process or tool to convert the application code to an artifact. An artifact is a packaged form of an application required on a target platform: a container image, virtual machine image, even a simple ZIP file, or the like, for example. The build process may also include an optional "push" operation to push the built artifact to a registry so that is available for the deployment platform. For instance, the workflow tool can include a set of built-in plug-ins for tools to build a container or image for an application, such as Docker Build (see FIG. 6), Docker Pull Build, and Cloud Native Buildpacks, etc., or the like (see FIG. 7).

In one exemplary implementation, as shown in FIG. 6, configuration file for a project "my-project" uses Cloud Native Buildpacks for the build component, and Docker as a registry from the build process. Kubernetes native systems are used for the deployment component as well as the release component. Accordingly, the Kubernetes service primitives are used to point to the correct deployment for the public to see, but in a consistent workflow defined by the single configuration file.

FIG. 8 shows an exemplary output when the workflow tool is run, showing the build, the output during the build process, the deploy and output during the deployment process, and then a release at the end. As shown in FIG. 8, with the release, a release URL is provided. The release URL is the public URL provided by the release platform by which users can access this application.

Further, a deployment URL is generated by the URL generator 212 of the workflow processor 204. The deployment URL has a specific domain, in this example a waypoint.run domain named after a name of the workflow tool. This domain uses a service that is run, separate from the workflow tool, to provide routable URLs for all deployments. This can be an optional service, but which can provide a URL to every application built, irrespective of the platform it is on, and it is consistent across platforms. Accordingly, the workflow tool described herein works with any application code and with any platform. It does not matter what programming language is used, or which platform the application is being deployed to, the workflow tool provides a consistent workflow, URL output, and deployment URLs.

Validating Deployments

Figure 3:
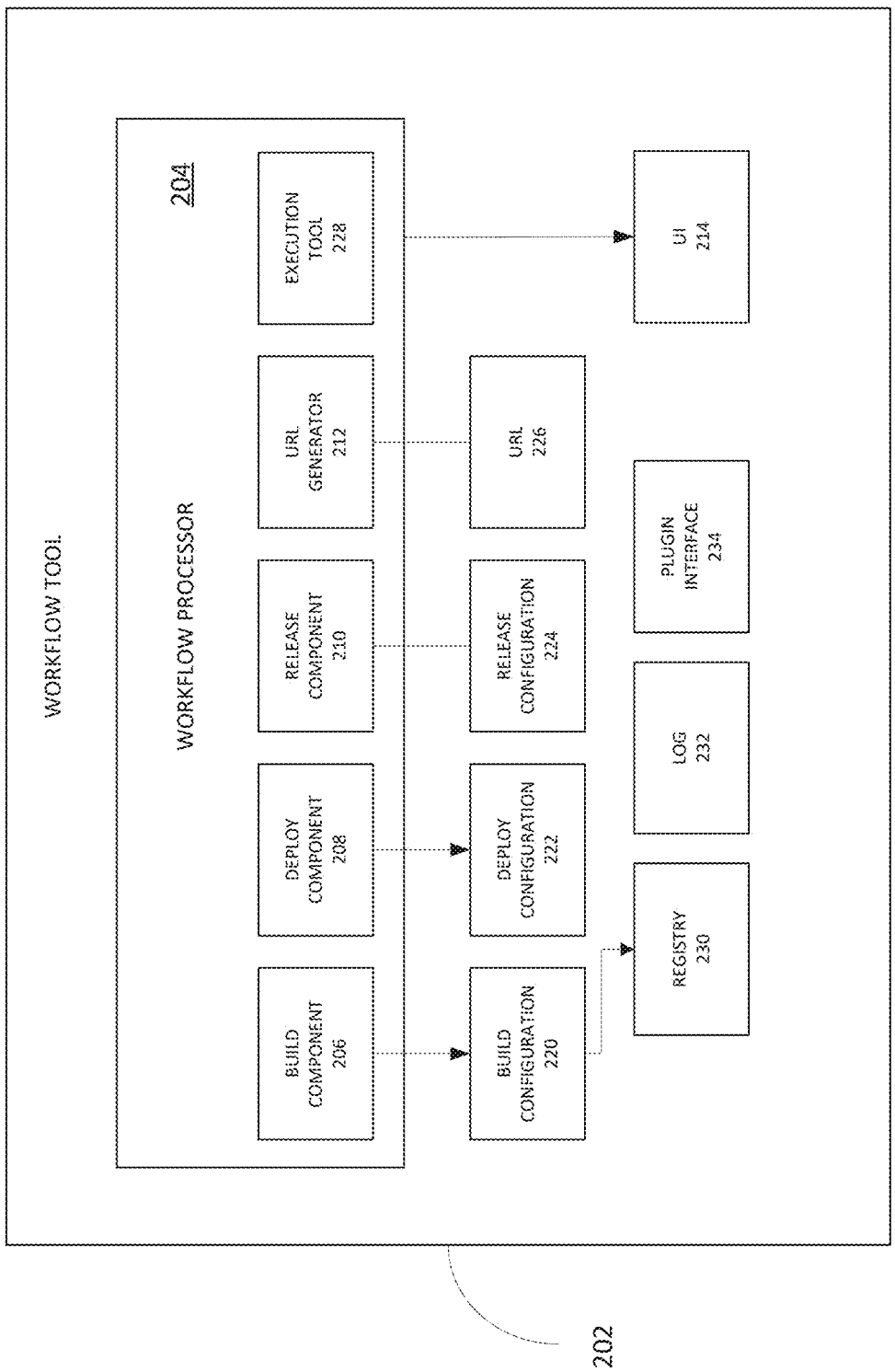
FIG. 3 is a block diagram illustrating aspects of a workflow tool according to various implementations of the current subject matter.

Once the workflow tool is run, i.e. the built application is deployed, the next aspect is to be able to tell whether the application is running, regardless of which deployment tool is used. In some cases, this step may entail opening up a URL in a UI, refreshing the URL a few times, or checking logs related to the deployment. While these steps can often work, for efficiency and greater validation, as shown in FIG. 3, a workflow tool 202 can include several integrated tools and features that allow a user to easily validate that an application deployment is working correctly. For instance, a build process of a build component 206 of the workflow processor 204 may also include an optional "push" operation to push the build configuration 220 to a registry 230 so that it is available for the deployment platform.

UI

Figure 4:
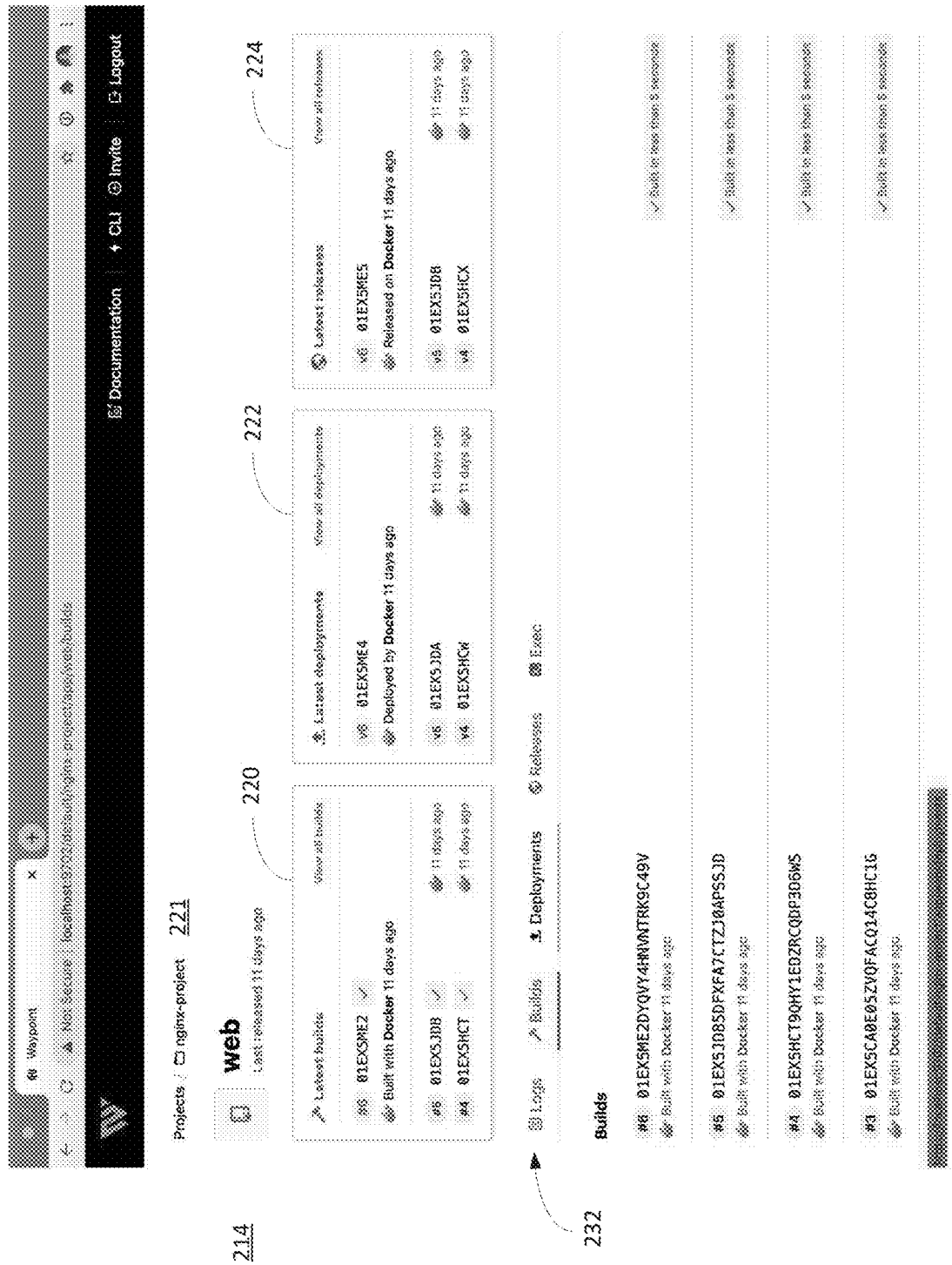
FIG. 4 shows a user interface in an exemplary graphical form.

In some implementations, the workflow tool 202 can generate a UI 214. The UI 214 can include one or more graphical user interfaces rendered in a display connected with a workflow processor 204. The UI 214 is configured to display a list of build configurations 220, deploy configurations 222, and release configurations 224, URLs 226 (such as release URL and deployment URL), as well as a current status of each of these. FIG. 4 shows the UI 214 in an exemplary graphical form, and illustrated a graphical user interface for one of any number of projects 221. The UI 214 can be customizable and/or configurable to suit user preferences. For instance, the UI 214 can have a "dark mode" for nighttime or viewing the UI 214 in a darkened environment. As discussed above, the UI 214 displays a list of build configurations 220, deploys 222, and release configurations 224, and a current status of each of these, as well as a set of logs 232 for each of these steps in the workflow for the project 221. Accordingly, the UI 214 provides an intuitive, interactive and efficient mechanism by which to verify that a deployment is complete.

Execution Tool

In some implementations, the workflow tool further includes an execution tool 228 that can be used to open a shell or execute any process in the context of a deployment. In some implementations, the execution tool 228 is a tool that is accessible via the command line, along with the build, deploy and release configurations 220, 222 and 224, respectively. The execution tool 228 provides access to any deployment, to allow a user to be able to ensure the application is properly deployed and running as intended. The execution tool 228 enables a user to execute commands in the context of a deployed application, and can be used to open up a shell for debugging, execute database migrations, and other application-specific functions. In some implementations, the execution tool 228 works by picking a random running instance of the latest deployment of the application, and executing within that environment.

The execution tool 228 works across any platform to which an application is to be deployed, despite similar functionality provided by each separate deployment tool, such as Kubernetes® or Google Cloud Run, or EC2 instances, etc. The execution tool 228 provides a similar experience across any deployment tool used, and therefore provides a consistent access to deployed application no matter which deployment is used, all without needed to exit the workflow tool and enter into a specific deployment tool's execution functionality.

Logs

In some implementations, another validation tool provided by the workflow tool 202 is an interface for accessing a set of logs 232, from which a user can see all the recent logs from each deployment of each application, which are also depicted in FIG. 4. The logs 232 shown in FIG. 4 display activity for the build configurations 220, but can also display deploy configurations 222 and release configurations 224, as well as any other executions from the execution tool 228.

As with the execution tool, the workflow tool logs 232 work across every platform, as well as with each deployment tool, and using a consistent workflow. In some cases, these logs 232 are not meant to replace long-term log storage or log searching, especially since most deployment tools include their own log functionality, but rather are configured to provide log access for a recent history of deployments, so as to enable a user to quickly see each deployment and/or to verify that each specific deployment is up and running as expected. These logs 232 further assist a user in being able to debug any issues that get logged during the deployment.

Data Model

Figure 9:
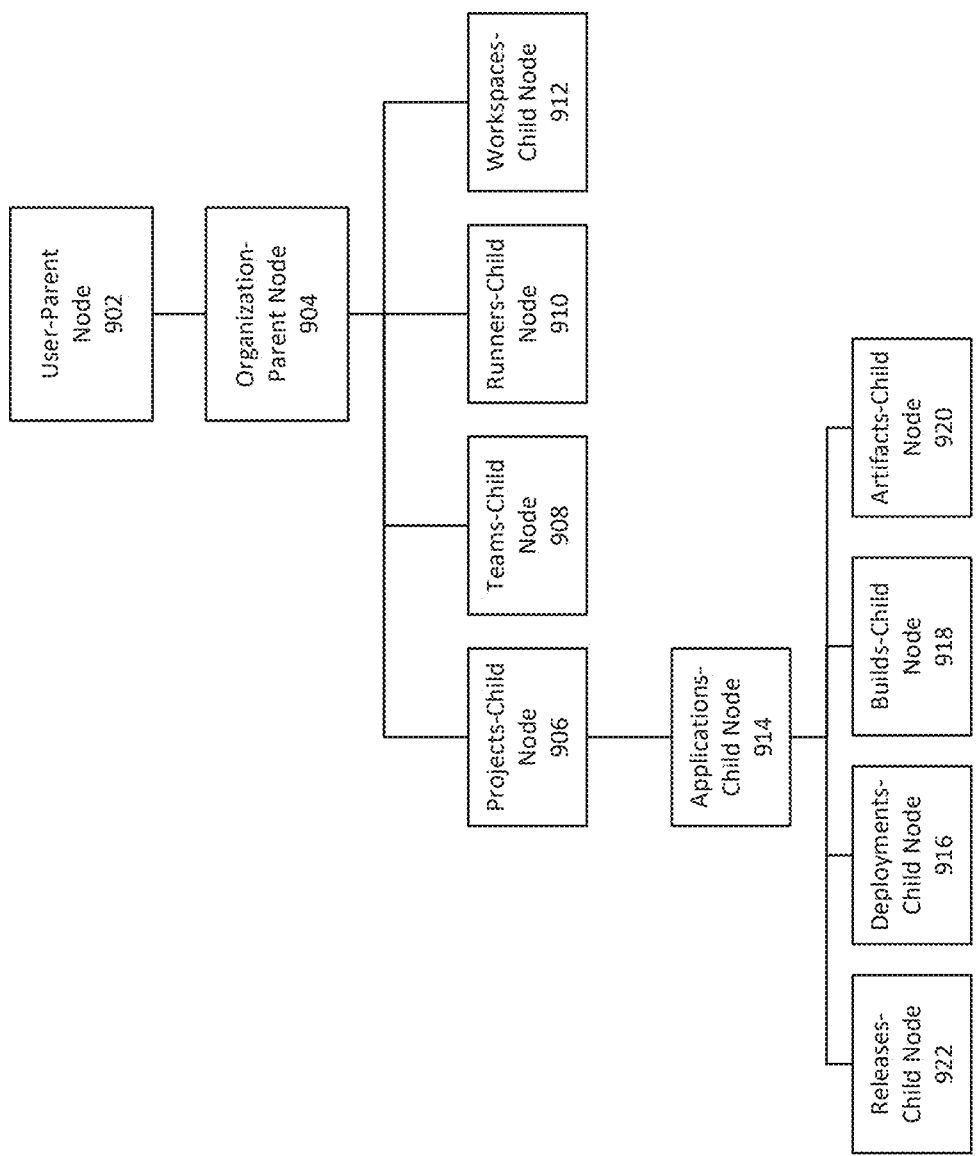
FIG. 9 shows a hierarchical tree with parent nodes and child nodes.

The data model is a hierarchical tree with nodes that store the data related to the application code. The data model is depicted in FIG. 9 that shows one embodiment of the relationships between nodes in the tree. The nodes can include parent nodes 902-904 such as user-parent node 902 and organization-parent node 904. The organization-parent node 904 can be associated with a particular user-parent node 902. Child nodes 906-922 can be associated with a parent node 902-904 or another child node 906-922. For instance, projects-child nodes 906, teams-child nodes 908, runners-child nodes 910, and workspaces-child nodes 912 can be associated with an organization-parent node 904. Alternatively, releases-child nodes 922, deployments-child nodes 916, builds-child nodes 918, and artifacts-child nodes 920, can be associated with applications-child nodes 920.

A user-parent node 902 can be thought of as an account and is associated with a user. An organization-parent node 904 can represent an individual, a business unit or a true organization. A projects-child node 906 can be associated with a single source code repository. Multiple applications-child nodes 914 can be associated with a single project. The applications-child node 914 can contain the part of the project that is actually deployed and this can be a full application such as a monolithic Rails application or a single component of an application such as just the API server. Teams-child nodes 908 can contain permissions data about groups of users.

Extensibility

A key feature of the workflow tool, particularly for operating in a multi-cloud platform environment, is extensibility. Accordingly, in some implementations the workflow tool 202 includes a plugin interface 234, which enables the workflow to be flexible and work in any of a variety of present or future scenarios. For example, a common way to display applications is using practices such as Continuous Integration/Continuous Deployment (CI/CD), which is a standard practice in software engineering, especially when involving large development teams. In these scenarios, CI/CD is one preferred way to integrate the build-deploy-release cycle of the workflow. Accordingly, the workflow tool 202 can configured to be run directly within existing CI/CD platforms, such that deploying an application can be consistent across a variety of different places in a CI/CD environment.

Another example is a similar set of practices known as GitOps, or a Git-based workflow, which describes systems with declarative specifications that form the basis of continuous operations and tasks. Typically, a Git-based workflow includes a Git "push," which triggers a deployment either to production or to a preview state. To accommodate these practices, the workflow tool 202 can include one or more plugins to the plugin interface 234 for different control systems so that versioning and other operations can be directly integrated with Git workflows. With such GitHub integration, every branch will get a separate build-deploy-release component, and a deployment URL that is branch-specific. The separate component and branch-specific URL can allow a user to view any branch, get a preview of its deployment and how it is working. When the branch is merged into the main brand, the workflow tool will deploy the branch into production.

The workflow tool 202, via the plugin interface 234, is therefore extensible to these and other tools and practices for deploying applications, and which not only allows users to work in those deployment environments, but across multiple deployment environments in a highly consistent manner. The CLI of the workflow tool enables this consistency.

Figure 10:
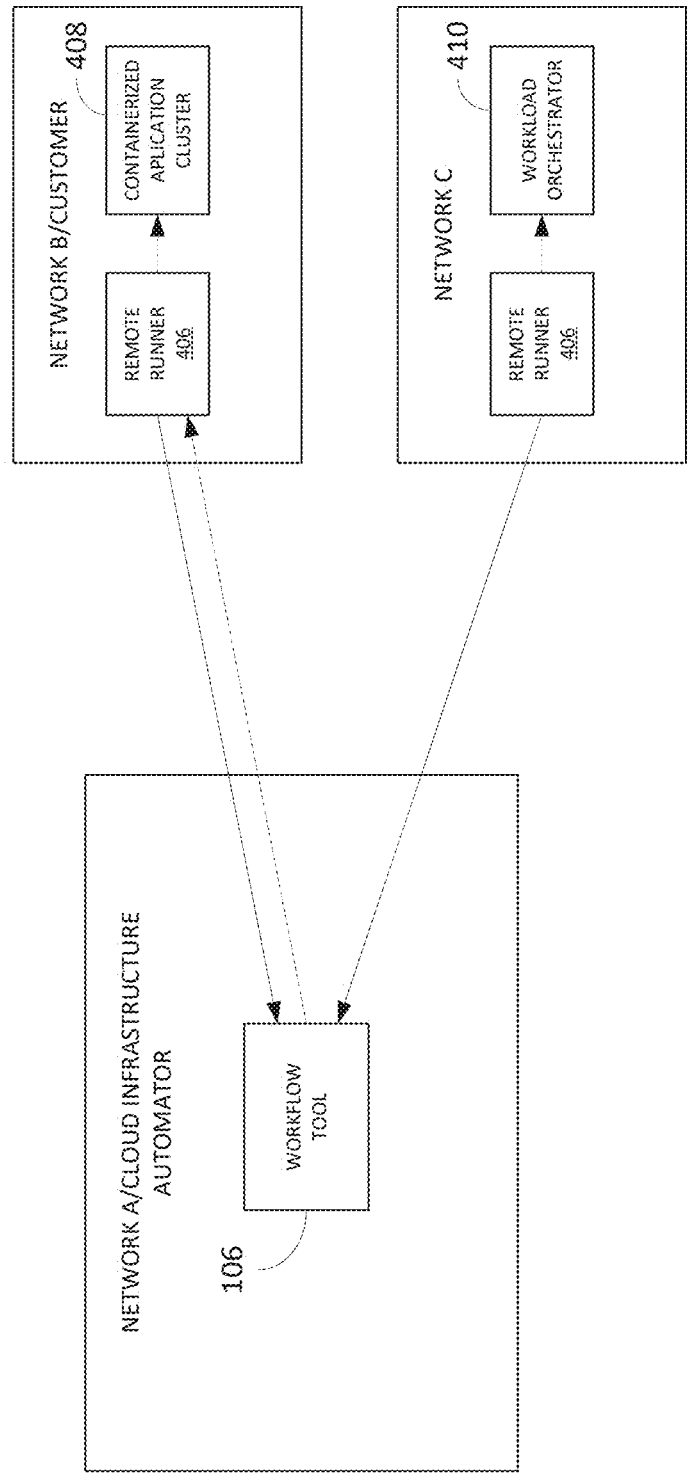
FIG. 10 illustrates remote runners for use with the workflow tool.

FIG. 10 depicts another form of extensibility via remote runners 406, which are remote workflow tools that execute workflow tool operations remotely. The remote runners 406 are configured to perform builds and deploys, polling projects for changes, and more. In the exemplary implementation shown in FIG. 10, a network A can include a central workflow tool 106, as is described herein. Network A can be a cloud infrastructure automation network, such as Hashicorp® Cloud Platform (HCP) or other cloud infrastructure provisioning system using the workflow tool 106 for building, deploying and releasing applications in a cloud computing environment.

In preferred implementations, the workflow tool 106 includes a workflow server, and the remote runners 406 can run anywhere via connectivity to the workflow server. For example, as shown, network B can be an application environment provided by a customer, and employing a containerized application cluster 408 such as Kubernetes®, and network C can be a separate application environment employing a workload orchestrator 410 such as Nomad® by Hashicorp®. Other types of remote networks are possible.

A request for an action or local resources, i.e. from network B, can be sent from a remote runner 406 to the workflow server of the workflow tool 106, which will in turn interface with the local resources at the containerized application cluster 408 via remote runner 406 in network B. Accordingly, remote runners 406 enable necessary security functionality, since user of the command line interface (CLI) of the workflow server of the workflow tool 106 no longer need direct access to the targets they are deploying to (i.e. network B and/or network C), nor need credentials to access those targets. The CLI needs only access to the workflow server of the central workflow tool 106, and the remote runners 406 can maintain the credentials needed to deploy in their corresponding network environments. Therefore, customers can build, deploy and release resources within their own private, controlled environment via remote runners 406.

Figure 11:
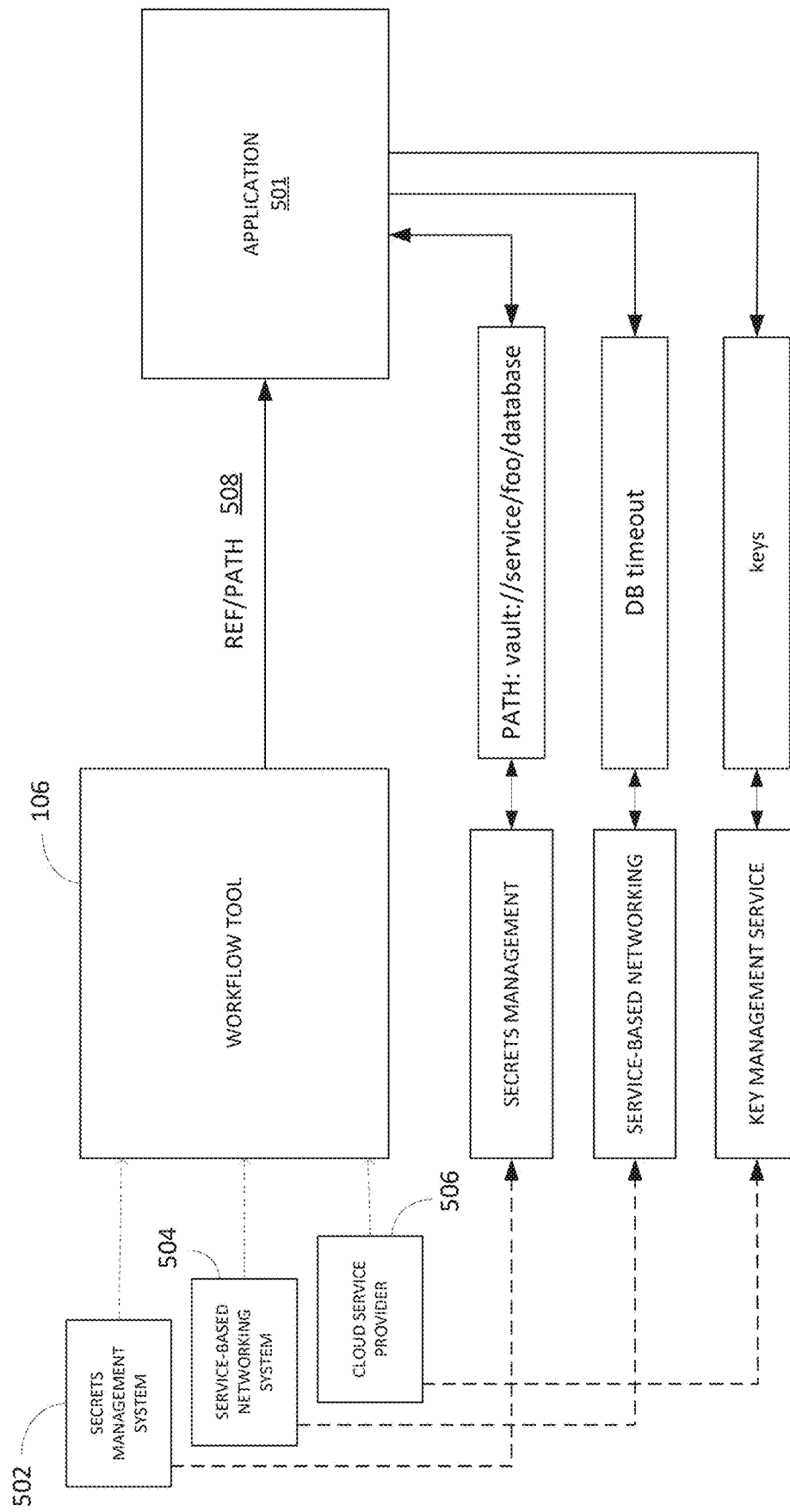
FIG. 11 illustrates secrets management for a workflow tool to build, deploy and release applications to one or more cloud computing platforms.

FIG. 11 illustrates secrets management for a workflow tool 106 to build, deploy and release applications 501 to one or more cloud computing platforms, in accordance with some implementations of the present disclosure. Secrets can include credentials such as usernames and passwords, such as provided by a secrets management system 502 such as Vault® by Hashicorp, database parameters and timeouts as provided by a service-based networking system 504 such as Consul® by Hashicorp, and configuration or database keys as provided by a key management service of a cloud service provider 506, such as AWS®. In some implementations, only a reference to necessary credentials, database timeouts, and keys are provided to the application 501 by a reference path 508.

At the application, the references are received, and can be directed to the external system, such as secrets management system 502, service-based networking system 504, and cloud service provider 506, such that the workflow tool 106 does not need to specify a value of the secret, but rather can rely on the reference to obtain the value directly from the associated system.

Figure 12:
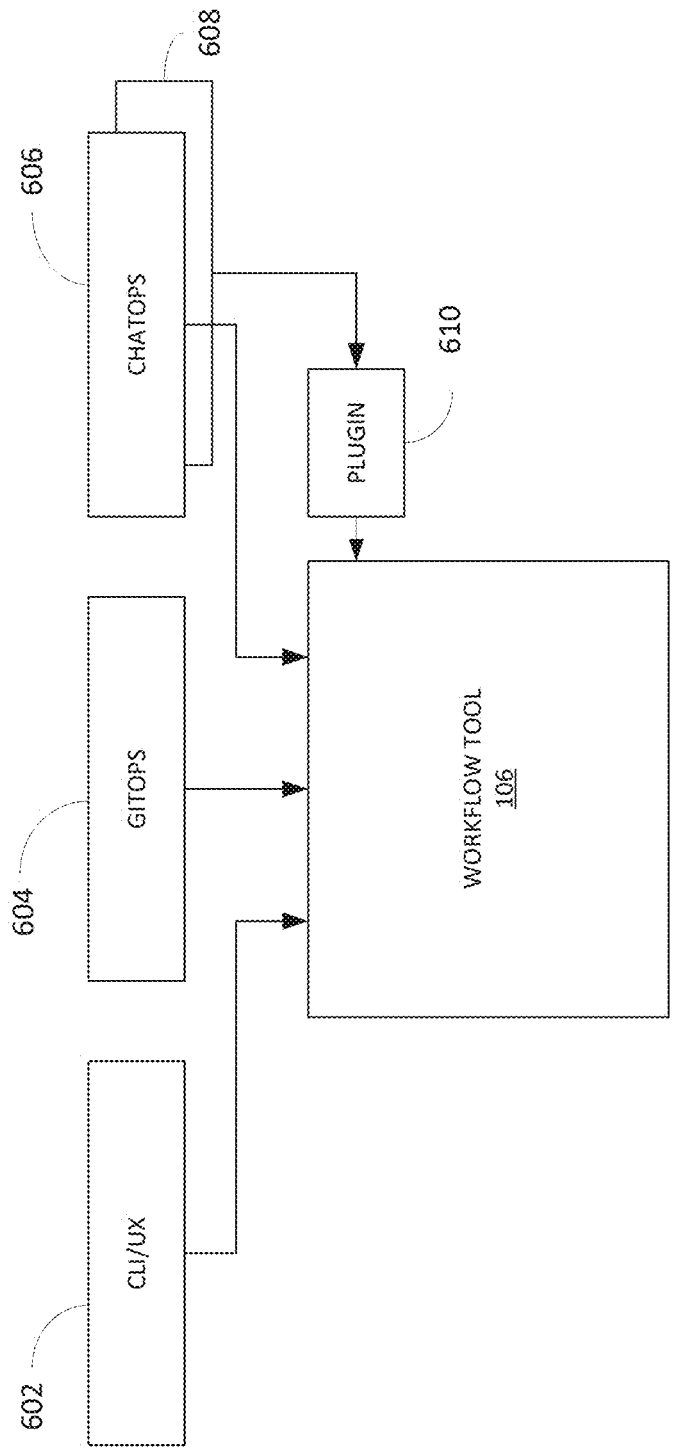
FIG. 12 illustrates chat-ops integration for the workflow tool.

FIG. 12 illustrates chat-ops integration for the workflow tool 106. As shown, application code to the workflow tool 106 can be provided by a command line interface/user interface or experience (CLI/UX) 602, such as the CLI for Hashicorp HCP®. Other code and commands to the workflow tool 106 can be received from a GitOps system and repository 604, which can provide application code from a GitHub or other similar open-source repository. Further, various online code development platforms with a chat function, or chat-ops such as Slack®, have been introduced recently where developers and programmers can share code and associated commentary via a chat interface. The workflow tool 106 is configured for two-way interaction with many such chat-ops 606, but other chat-ops 608 can communicate with the workflow tool 106 via a plug-in 610. Thus, the workflow tool 106 can receive code and other instructions from a multitude of sources, directly or via plug-in 610.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. In some circumstances, the programmable processor can be a virtual processor (e.g., server based). The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system comprising:
 a workflow tool executed by one or more computer processors under instructions from a non-transitory machine-readable medium, the one or more computer processors using the workflow tool for building, deploying and releasing application code of an application to one or more cloud computing platforms via a network; and
 a hierarchical tree structure defining a data model for the workflow tool, the hierarchical tree structure having a plurality of nodes that store data related to the application code, the hierarchical tree structure comprising:
 a user-parent node representing a user of the workflow tool;
 an organization-parent node representing an organization associated with the user;
  a projects-child node representing one or more projects associated with the organization;
  a teams-child node representing a grouping of persons associated with the organization;
  a runners-child node representing one or more remote workflow tools associated with the organization and registered with the workflow tool;
  a workspaces-child node representing physical resources associated with the organization; and
  an applications-child node representing the application associated with a project.

2. The system of claim 1, further comprising:
 a builds-child node representing results of operations of a build tool of the workflow tool for building the application;
 a deployments-child node representing results of operations of a deployment tool of the workflow tool for deploying the application;
 an artifacts-child node representing results of operations of a conversion tool for converting the application code to an artifact usable by each of the one or more cloud computing platforms; and
 a releases-child node representing results of the workflow tool releasing the application code or artifact to the one or more cloud computing platforms.

3. A system in accordance with claim 2, wherein the builds-child node, deployments-child node, the artifacts-child node, and the releases-child node are child nodes of the applications-child node.

4. A system in accordance with claim 2, wherein the releases-child node is a child node of the artifacts-child node.

5. A computer-implemented method comprising:
 accessing, by a one or more computer processors, a hierarchical tree structure defining a data model for a workflow tool, the one or more computer processors using the workflow tool being for building, deploying and releasing application code of an application to one or more cloud computing platforms, the hierarchical tree structure having a plurality of nodes that store data related to the application code;
 receiving, by the one or more computer processors, a request to add a projects-child node to the hierarchical tree structure, the request identifying an organization-parent node, the projects-child node being associated with a code repository; and
 adding, by the one or more computer processors, the projects-child node to the hierarchy as a child node of the identified organization-parent node, the projects-child node being configured to support one or more dependent child nodes depending from the projects-child node, the one or more dependent child nodes including at least one of an applications-child node, a builds-child node, a deployments-child node, an artifacts-child node, or a releases-child node.

6. The method of claim 5, wherein the applications-child node represents the application associated with the one or more projects;
 the builds-child node has data that represents results of operations of a build tool of the workflow tool for building the application;
 the deployments-child node has data that represents results of operations of a deployment tool of the workflow tool for deploying the application;
 the artifacts-child node has data that represents results of operations of a conversion tool for converting the application code to an artifact usable by each of the one or more cloud computing platforms; and
 the releases-child node has data that represents results of the workflow tool releasing the application code or artifact to the one or more cloud computing platforms.

7. The method of claim 5, further comprising:
 a user-parent node representing a user of the workflow tool;
 a teams-child node representing a grouping of persons associated with the organization;
 a runners-child node representing one or more remote workflow tools associated with the organization and registered with the workflow tool; and
 a workspaces-child node representing physical resources associated with the organization.

8. The method of claim 5, wherein the releases-child node is a child node of the artifacts-child node.

9. A system comprising:
 a workflow tool executed by a programmable processor under instructions from a non-transitory machine-readable medium, the workflow tool being configured for building, deploying and releasing application code of an application to one or more cloud computing platforms; and
 a data model for the workflow tool, the data model being defined as a hierarchical tree structure having a plurality of nodes that store data related to the application code, the data model comprising:
 a user-parent node representing a user of the workflow tool;
 an organization-parent node representing an organization associated with the user;

a projects-child node representing one or more projects associated with the organization;
a teams-child node representing a grouping of persons associated with the organization;
a runners-child node representing one or more remote workflow tools associated with the organization and registered with the workflow tool;
a workspaces-child node representing physical resources associated with the organization; and
an applications-child node representing the application associated with the one or more projects.

10. The system of claim 9, further comprising:
a builds-child node representing results of operations of a build tool of the workflow tool for building the application;
a deployments-child node representing results of operations of a deployment tool of the workflow tool for deploying the application;
an artifacts-child node representing results of operations of a conversion tool for converting the application code to an artifact usable by each of the one or more cloud computing platforms; and
a releases-child node representing results of the workflow tool releasing the application code or artifact to the one or more cloud computing platforms.

11. A system in accordance with claim 10, wherein the builds-child node, deployments-child node, the artifacts-child node, and the releases-child node are child nodes of the applications-child node.

12. A system in accordance with claim 10, wherein the releases-child node is a child node of the artifacts-child node.

13. A system for building, deploying and releasing application code of an application to one or more cloud computing platforms, the system comprising:
a programmable processor; and
a non-transitory machine-readable medium storing instructions that, when executed by the programmable processor, cause the programmable processor to generate a hierarchical data structure according to a data model used by a workflow tool for building, deploying and releasing the application code to the one or more cloud computing platforms, the programmable processor being at least one of one or more physical processors or one or more virtual processors, the hierarchical data structure comprising:
a user-parent node representing a user of the workflow tool;
an organization-parent node representing an organization associated with the user;
a projects-child node representing one or more projects associated with the organization;
a teams-child node representing a grouping of persons associated with the organization;
a runners-child node representing one or more remote workflow tools associated with the organization and registered with the workflow tool;
a workspaces-child node representing physical resources associated with the organization; and
an applications-child node representing the application associated with the one or more projects.

14. The system of claim 13, further comprising:
a builds-child node representing results of operations of a build tool of the workflow tool for building the application;
a deployments-child node representing results of operations of a deployment tool of the workflow tool for deploying the application;
an artifacts-child node representing results of operations of a conversion tool for converting the application code to an artifact usable by each of the one or more cloud computing platforms; and
a releases-child node representing results of the workflow tool releasing the application code or artifact to the one or more cloud computing platforms.

15. A system in accordance with claim 14, wherein the builds-child node, deployments-child node, the artifacts-child node, and the releases-child node are child nodes of the applications-child node.

16. A system in accordance with claim 14, wherein the releases-child node is a child node of the artifacts-child node.

* * * * *